United States Patent
Kaku et al.

[11] Patent Number: 5,725,446
[45] Date of Patent: Mar. 10, 1998

[54] BELT-TYPE AUTOMATIC TRANSMISSION

[75] Inventors: Hidetoshi Kaku, Kakogawa; Kiyohito Takano, Kobe, both of Japan

[73] Assignee: Kawasaki Jukogyo Kabushiki Kaisha, Hyogo, Japan

[21] Appl. No.: 609,862

[22] Filed: Mar. 1, 1996

[30] Foreign Application Priority Data

Mar. 2, 1995 [JP] Japan ................. 7-070817

[51] Int. Cl.⁶ ............... F16H 59/14; F16H 59/36
[52] U.S. Cl. ................. 474/13; 474/12; 474/11; 474/8; 474/17
[58] Field of Search ............. 474/8–13, 17, 474/19

[56] References Cited

U.S. PATENT DOCUMENTS

| | | | |
|---|---|---|---|
| 3,759,111 | 9/1973 | Hoff | 74/230 |
| 4,028,953 | 6/1977 | Lavallee | 74/230 |
| 4,051,739 | 10/1977 | Takagi et al. | 74/230.17 |
| 4,052,908 | 10/1977 | Takagi et al. | 74/230.17 |
| 4,229,989 | 10/1980 | Tamura | 474/12 |
| 4,313,728 | 2/1982 | Prasad | 474/14 |
| 4,433,594 | 2/1984 | Smirl | 74/689 |
| 4,504,247 | 3/1985 | Chana et al. | 474/17 |
| 5,050,457 | 9/1991 | Takayama et al. | 74/866 |
| 5,421,784 | 6/1995 | Robert | 474/13 |
| 5,597,060 | 1/1997 | Huddleston et al. | 192/105 C |

FOREIGN PATENT DOCUMENTS

| | | |
|---|---|---|
| 52-15679 | 7/1950 | Japan . |
| 6-33136 | 11/1994 | Japan . |

*Primary Examiner*—Tamara L. Graysay
*Assistant Examiner*—Gary S. Hartmann
*Attorney, Agent, or Firm*—Marshall, O'Toole, Gerstein, Murray & Borun

[57] ABSTRACT

A belt-type automatic transmission wherein the engine brake can automatically work when a vehicle runs on a downward slope, comprising a pair of sheaves 21 provided on a driving shaft 20, the pair of sheaves 21 having a fixed sheave 22 and a movable sheave 23 which is caused to approach the fixed sheave 22 by the force which is increased with a revolution speed, a pair of sheaves 31 provided on a driven shaft 30, the pair of sheaves 31 having a fixed sheave 32 and a movable sheave 33 which is caused to approach the fixed sheave 32 by elastic force, a V belt 28 mounted around the pairs of sheaves 21 and 31, wherein the maximum opening between the sheaves 21 on the driving shaft 20 is restricted so as not to loosen the V belt 28, a clutch 15 for starting movement provided between an engine 1 and the driving shaft 20, and shift-up prevention means 40 for automatically giving the force for the movable sheave 33 to approach the fixed sheave 32 when revolving torque is transmitted from the driven shaft 30 to the pair of sheaves 31 on the driven shaft 30.

3 Claims, 5 Drawing Sheets

BELT-TYPE AUTOMATIC TRANSMISSION

BACKGROUND OF THE INVENTION

The present invention relates to a belt-type automatic transmission, which is also called a belt converter, for transmitting power and automatically changing a speed continuously through a V belt.

Some of compact two-wheelers and working four wheel vehicles have a belt-type automatic transmission provided thereon. This kind of transmission has a structure in which a pair of sheaves that can change opening(space between two sheaves) are attached to a driving shaft, that is, a shaft closer to a prime mover such as an engine for power transmission, and attached also to a driven shaft, that is, a shaft for receiving power from the driving shaft and transmitting the power to driving wheels, and a loop of V belt for power transmission is mounted around the two pairs of sheaves. When the opening between the sheaves is changed, the wrapping radius(radius of curvature) of the V belt on each shaft is changed. Consequently, the revolution speed ratio of the shafts is changed continuously. The space between the sheaves of the driving shaft is automatically changed according to a revolution speed. Thereby, automatic speed change can suitably be performed.

Figure 5:
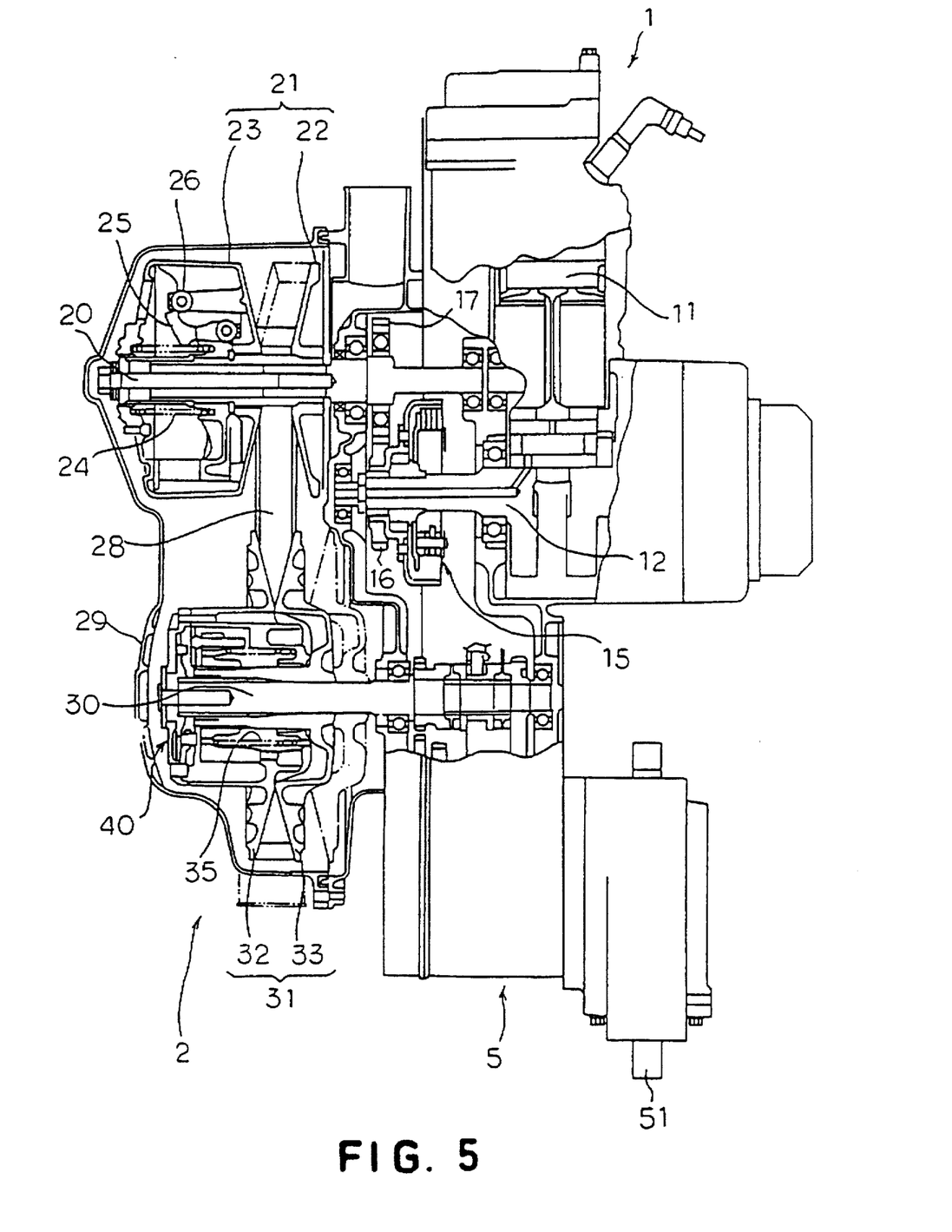
FIG. 5 is a schematic view showing the structure of a general belt-type automatic transmission according to the prior art.

FIG. 5 shows the structure of a general belt-type automatic transmission according to the prior art. An automatic transmission 2' shown in the figure is connected between an engine 1' and a transmission 5' as the driving means for a working four-wheel vehicle which is not shown in the figure. The automatic transmission 2' has a driving shaft 20 directly connected to an output shaft 12 of the engine 1' and a driven shaft 30 directly connected to an input shaft of the transmission 5'.

The driving shaft 20 has a pair of sheaves 21 provided thereon. The sheaves 21 include a fixed sheave 22 which cannot move in either of the axial and circumferential directions thereof, and a movable sheave 23 which can move so as to change the space therebetween (but which cannot move in the circumferential direction). Similarly, the driven shaft 30 has a pair of sheaves 31 provided thereon. The sheaves 31 include a fixed sheave 32 and a movable sheave 33. A loop of V belt 28 for power transmission is mounted around the sheaves 21 and 31. Pairs of sheaves 21 and 31 have conical surfaces opposed to each other so that the V belt 28 can be held therebetween. The conical surfaces get broader outwardly. Each opening between the pair of sheaves 21 and between the pair of sheaves 31 can continuously be changed according to the movement of each of the movable sheaves 23 and 33. Consequently, the wrapping radius of the V belt 28 on each of the shafts 20 and 30 is changed continuously, so that continuous speed change can be realized.

The movable sheave 23 provided on the driving shaft 20 has a structure in which the movable sheave 23 approaches the fixed sheave 22 as a revolution speed thereof is increased so that suitable speed change can automatically be carried out. More specifically, a coil spring 24 is provided on the driving shaft 20. The coil spring 24 always pushes the movable sheave 23 so that the movable sheave 23 can go away from the fixed sheave 22. A centrifugal cam 25 is provided on the driving shaft 20 so as to push the movable sheave 23 toward the fixed sheave 22 through a roller 26. In case of low-speed revolution, the movable sheave 23 stays away from the fixed sheave 22 by the operation of the coil spring 24. When the revolution speed is increased, the centrifugal cam 25 pushes the roller 26 based on centrifugal force. Consequently, the movable sheave 23 is caused to approach the fixed sheave 22 by the force which is increased with a rise in speed. As a result, the opening of the sheaves 21 is reduced.

The pair of sheaves 31 provided on the driven shaft 30 have the fixed sheave 32 provided integrally with the driven shaft 30, and the movable sheave 33 caused to always approach the fixed sheave 32 by elastic force. In detail, the fixed sheave 32 has a cover 32b connected to a cylindrical member 32a with a bolt 32c. The cylindrical member 32a is integrated with the fixed sheave 32. The cover 32b is integrated with the driven shaft 30 with a bolt 32d and the like. The movable sheave 33 receives the elastic force of a torsion coil spring 35 in the axial direction through a torque cam (which is also called a ramp) 34, and is thereby pushed toward the fixed sheave 32. More specifically, the movable sheave 33 is fitted in the driven shaft 30 so as to freely move in the axial direction and circumferential direction. A torque cam 34 is attached onto the periphery of a cylindrical member 33a with a spline and a metallic member which does not cause slippage of the torque cam 34 in the axial direction. The torque cam 34 includes a surface which is inclined in the axial and circumferential directions. The inclined surface is in contact with a sliding member 32e of the fixed sheave 32. The torsion coil spring 35 is provided between the fixed sheave 32 and the torque cam 34. Relative revolving force is generated in the circumferential direction by elastic force of the torsion coil spring 35 between the fixed sheave 32 and the torque cam 34, so that the inclined surface of the torque cam 34 is pushed onto the sliding member 32e of the fixed sheave 32. Thus, the torque cam 34 receives reaction force in the circumferential and axial directions from the sliding member 32e of the fixed sheave 32. The axial direction component of the reaction force makes the movable sheave 33 approach the fixed sheave 32.

According to the belt-type automatic transmission shown in FIG. 5 which has the above-mentioned structure, continuously automatic speed change can be realized in the manner that the wrapping radius of the V belt 28 on each of the pairs of sheaves 21 and 31 is automatically changed when the revolution speed of the engine 1' is increased so that the driving shaft 20 revolves at a high speed. More specifically, when the revolution speed of the driving shaft 20 is increased in the condition shown in FIG. 5, the movable sheave 23 approaches the fixed sheave 22 by the operation of the centrifugal cam 25 and the like so that the wrapping radius of the V belt 28 on the sheaves 21 is gradually increased. Consequently, the wrapping radius of the V belt 28 on the pair of sheaves 31 provided on the driven shaft 30 is reduced based on the fact that the length of the V belt 28 is constant, so that the speed change ratio between the shafts 20 and 30 move to the so-called high-speed range, namely the shift up operation is performed. Within the high-speed range in which the wrapping radius of the V belt 28 is great on the driving shaft 20 and small on the driven shaft 30, a vehicle can run at a high speed while driving the engine 1' at the suitable revolution speed.

FIG. 5 shows the state in which the pair of sheaves 21 on the driving shaft 20 are wide opened each other so as not to hold the V belt 28 therebetween. Consequently, the V belt 28 is loosened and the pair of sheaves 21 are opened so as not to transmit power to the V belt 28 when the engine revolves in low-speed, so that the vehicle is prevented from moving forward.

In other word, the so-called creep is prevented during idling condition.

Another means can be selected to switch idling and forward movement preventing said creep. More specifically, the maximum opening between the pair of sheaves 21, that is, the maximum space between the fixed sheave 22 and the movable sheave 23, is restricted so that the V belt 28 is always held therebetween so as not to be loosened. In addition, a clutch(which is not shown in FIG. 5) for starting movement can be provided between the driving shaft 20 and the output shaft 12 of the engine 1'. In case the clutch is turned off during idling condition and turned on at the time of starting movement, the creep is not caused and the starting movement can smoothly be performed.

There has been disclosed Japanese Unexamined Patent Publication No. 6-330995 for the prior art reference.

In case a belt-type automatic transmission according to the prior art is provided on a vehicle, since the so-called engine brake does not work when the vehicle runs on a downward slope, a burden to the brake usually increases. For example, the automatic transmission 2' shown in FIG. 5 does not include the clutch for starting movement and opens the pair of sheaves 21 on the driving shaft 20 in idling condition. In this type of vehicle, when the vehicle runs on the downward slope, an accelerator which is not shown in the figure is turned off so that the engine 1 revolves at a low speed in the same manner as the idling. Consequently, the pair of sheaves 21 are opened each other so that the V belt 28 is loosened. Thereby, revolution can freely be carried out from the driven shaft 30 to driving wheels which are not shown in the figure, so that wheels cannot receive the braking force from the engine 1'. Even though a driver steps on the accelerator to cause the engine 1' to revolve at a high speed and to hold the V belt 28 between the pair of sheaves 21, the pair of sheaves 21 are opened again when the revolution speed of the engine 1' is decreased, and the engine brake does not work.

Also in case the maximum opening of the pair of sheaves 21 is restricted so as not to loosen the V belt 28 and the clutch for starting movement is provided as described above, the engine brake does not work when the vehicle runs on the downward slope. More specifically, if the clutch is not turned off, the revolution speed of the driving shaft 20 is increased as the speed of the vehicle is increased on the downward slope, and the speed change ratio moves to the high-speed range as described above. As a result, the effect of the engine brake can hardly be obtained. If the clutch is turned off, the engine brake does not work at all in the same manner as in the automatic transmission 2' shown in FIG. 5.

SUMMARY OF THE INVENTION

It is an object of the present invention to provide a belt-type automatic transmission wherein the engine brake can automatically work at the necessary situation, such as, when a vehicle runs on a downward slope, and the speed change ratio can be prevented from moving to the high-speed range even though the speed of the vehicle is increased on the downward slope.

The belt-type automatic transmission according to the present invention comprises;

a pair of sheaves provided on a driving shaft, the pair of sheaves having a fixed sheave which cannot move in the axial direction and a movable sheave which is caused to approach the fixed sheave by the force which is increased with a revolution speed, (b) a pair of sheaves provided on a driven shaft, the pair of sheaves having a fixed sheave which cannot move in the axial direction and a movable sheave which is caused to approach the fixed sheave by elastic force, and, (c) a V belt mounted around the pairs of sheaves on the driving and driven shafts, (d) wherein the maximum opening between the pair of sheaves on the driving shaft is restricted so as not to loosen the V belt, that is, so as to always transmit power, and (e) a clutch for starting movement provided between a prime mover and the driving shaft and (f) means for automatically adding the force for the movable sheave to approach the fixed sheave when revolution torque is transmitted from the driven shaft to the pair of sheaves on the driven shaft, that is, for adding the approach force to the elastic force described in (b)(which will be called shift-up prevention means below) are provided.

According to the automatic transmission of the present invention, it is preferred that the driven shaft and the fixed sheave provided thereon are connected to each other so as to transmit revolution torque through a link which can change the attitude thereof depending on whether it receives the torque from the pair of sheaves or the driven shaft, and that the link is connected to the movable sheave as the shift-up prevention means described in (f). The link incorporated in the automatic transmission receives the force for changing the attitude thereof. However, the link determines whether to actually change the attitude thereof or not depending on the approach force of the pair of sheaves on the driving shaft which corresponds to the revolution speed, that is, the force which fastens the V belt to increase the wrapping radius, the approach force of the sheaves on the driven shaft generated by elastic force, and the magnitude of the torque which is transmitted.

In order to generate the elastic force described in (b) which causes the movable sheave to approach the fixed sheave on the driven shaft, a torque cam having a surface inclined in the axial and circumferential directions is connected to the movable sheave, and a torsion coil spring is provided between the torque cam and the fixed sheave. The torsion coil spring pushes the torque cam in the circumferential direction so as to cause the inclined surface to come in contact with a part of the fixed sheave. In this respect, the automatic transmission of the present invention has the same structure as that of FIG. 5. The torque cam causes the movable sheave to approach the fixed sheave by the axial direction component of reaction force generated by said contact. For the shift-up prevention means described in said (f), a link is preferably attached to a member integral with the fixed sheave (which includes the fixed sheave itself) through a first connecting pin which is parallel with the driven shaft so that it can relatively revolve. Furthermore, it is preferred that a second connecting pin provided on the link is loosely fitted in a member which is integrated with the driven shaft, that is, it is fitted so as to move along a slot and the like within the predetermined range and not to disengage. In addition, it is preferred that a third connecting pin provided on the link is loosely fitted in a member which can push the torque cam in the circumferential direction. In case the revolving torque is transmitted from the driven shaft to the pair of sheaves provided on the driven shaft, the direction in which the torque cam is pushed by said member is the same as the direction in which the torque cam is pushed by the torsion coil spring.

According to the belt-type automatic transmission of the present invention, each of the driving and driven shafts has a pair of sheaves which can change opening therebetween. Consequently, when the opening is changed, the wrapping radius of the V belt on each shaft can be changed continuously. Thus, the speed ratio of the driving shaft to the driven shaft can be set continuously. Accordingly, when the driving shaft of the automatic transmission is connected to a prime mover such as the engine of a vehicle and the driven shaft of the automatic transmission is connected to the driving wheels, the automatic transmission functions as a continuously variable transmission of the vehicle. When the revolution speed of the driving shaft is increased, the movable sheave approaches the fixed sheave to reduce the opening between the sheaves so that the wrapping radius of the V belt is increased. Consequently, the automatic transmission of the present invention has the same operation as that of the automatic transmission according to the aforesaid prior art. Thus, the automatic speed change can smoothly be performed. In case of starting movement, when the clutch for starting movement which is turned off during the idling condition is manually or automatically engaged and the revolution speed of the engine is increased, the automatic transmission gradually switches from the low-speed range to the high-speed range. As a result, the speed of the vehicle is smoothly increased.

According to the automatic transmission of the present invention, also in case the vehicle runs on a downward slope, the so-called engine brake always operates effectively on driving wheels. The reasons are as follows.

First of all, as far as the clutch for starting movement is kept on engaging without turning off automatically, the revolution of the driving wheels is always transmitted to the engine through the V belt. More specifically, the maximum opening between the pair of sheaves on the driving shaft is restricted and the opening between the pair of sheaves on the driven shaft is reduced by elastic force, so that the V belt is always held between the pair of sheaves so as not to be loosened. Consequently, power can always be transmitted. It may be possible to use a clutch which is automatically interrupted by revolution speed, such as a centrifugal clutch. When such a clutch is accompanied with an one-way-clutch function, the engine brake continuously works even though the revolution speed of the prime mover goes down less than the idling speed. That is caused by the function of said one-way-clutch, such as, the clutch is not turned off even though the revolution speed of the clutch is in low speed as far as the clutch is revolved by the driving wheel.

The second reason why the engine brake always operates effectively is that the automatic transmission of the present invention can prevent the speed change to the high-speed range even though the speed of the vehicle is increased on the downward slope so that the revolution speed of the driving shaft side is increased. Because, when the automatic transmission receives the revolving torque from the driven shaft side, the shift-up prevention means automatically gives the force for the movable sheave on the driven shaft to approach the fixed sheave. If such force is at work together with the aforesaid elastic force, the pair of sheaves on the driven shaft is forced to reduce the opening therebetween with very great strength, and the wrapping radius of the V belt on the driven shaft is hard to reduce even though the revolution speed of the driving shaft is increased to close the pair of sheaves provided thereon. Consequently, the speed change to the high-speed range side is controlled. During normal running, torque is transmitted from the driving shaft to the driven shaft through the V belt and the sheaves. On the other hand, in case the vehicle runs on the downward slope by causing the engine brake to work, the revolving torque in the same direction as the revolving direction is transmitted from the driven shaft to the sheaves, the V belt and the driving shaft. Thus, the automatic transmission receives the torque from the driven shaft when the engine brake works during running on the downward slope. According to the automatic transmission of the present invention, the speed change to the high-speed range is always controlled while the engine brake is working.

The shift-up prevention means is comprised of a link which has a mechanically simple structure and smoothly operates. The link can change the attitude thereof depending on whether it receives the revolving torque from the pair of sheaves, that is, the driving shaft or from the driven shaft. When the torque is transmitted from the driven shaft side to the link so that the engine brake works, the link receives the force to change the attitude thereof. Consequently, the force to change the attitude of the link is transmitted to the movable sheave so as to cause the movable sheave to approach the fixed sheave while the engine brake is working. Thereby, the shift-up prevention can be performed. In addition, the link is connected so that torque can be transmitted between the driven shaft and the fixed sheave. Consequently, when the torque between the driven shaft and the engine, that is, the strength of the engine brake is increased, the force to change the attitude of the link becomes greater so that the movable sheave receives the force having the equivalent strength to approach the fixed sheave. Accordingly, in such a case the downward slope is steep, that is, the engine brake works harder, the speed change to the high-speed range is prevented more greatly to keep the function of the engine brake.

The elastic force for the movable sheave to approach the fixed sheave on the driven shaft is generated by the operation of the torque cam and the torsion coil spring in the following manner. More specifically, (1) the torsion coil spring provided between the torque cam and the fixed sheave pushes the torque cam in the circumferential direction by the force generated based on the elastic force, (2) the inclined surface of the torque cam is then pushed onto a part of the fixed sheave, (3) the inclined surface is inclined in the axial and circumferential directions of the driven shaft, so that the reaction force generated by the contact to the fixed sheave by a push in the circumferential direction has the axial component to move the torque cam in the axial direction, and (4) the torque cam is connected to the movable sheave, so that the elastic force for approaching the fixed sheave is given to the movable sheave if the orientation of the inclined surface is determined to generate the component in the suitable direction.

The shift-up prevention means functions in the following manner. More specifically, in case the vehicle runs on the downward slope, the following operation is obtained:

(1) A link which is attached to a member integral with the fixed sheave through a first connecting pin and which has a second connecting pin loosely fitted in a member integral with the driven shaft receives torque transmitted from the driven shaft to get the force for revolving around the first connecting pin.

(2) The revolving force of the link pushes the torque cam in the circumferential direction through a third connecting pin of the link and a member in which the third connecting pin is loosely fitted.

(3) The direction of the revolving force of the link is suitably determined by the arrangement of each connecting pin and the like so that the force can push the torque cam in the same direction as the direction in which the torsion coil spring pushes the torque cam. Consequently, the torque cam which is pushed in the circumferential direction gives the force for the movable sheave to approach the fixed sheave. Thus, the speed change to the high-speed range side can be prevented while the engine brake is working.

These and other objects, features and advantages of the present invention will become more apparent upon a reading of the following detailed description and drawings.

BRIEF DESCRIPTION OF THE DRAWINGS

FIG. 3 (a) and FIG. 3 (b) are views seen in the direction of the arrow III—III shown in FIG. 2, FIG. 3 (a) having a cover 32b in FIG. 2 omitted and FIG. 3 (b) having a first disc 42 in FIG. 2 omitted;

FIG. 4 (a) and FIG. 4 (b) are views for explaining the function of the automatic transmission 2, FIG. 4 (a) showing the condition of shift-up prevention means 40 in which the engine brake works well, that is, the automatic transmission 2 is within the low-speed range and FIG. 4 (b) showing the condition of the shift-up prevention means 40 in which the automatic transmission 2 is within the high-speed range.

DETAILED DESCRIPTION OF PREFERRED EMBODIMENTS

Figure 1:
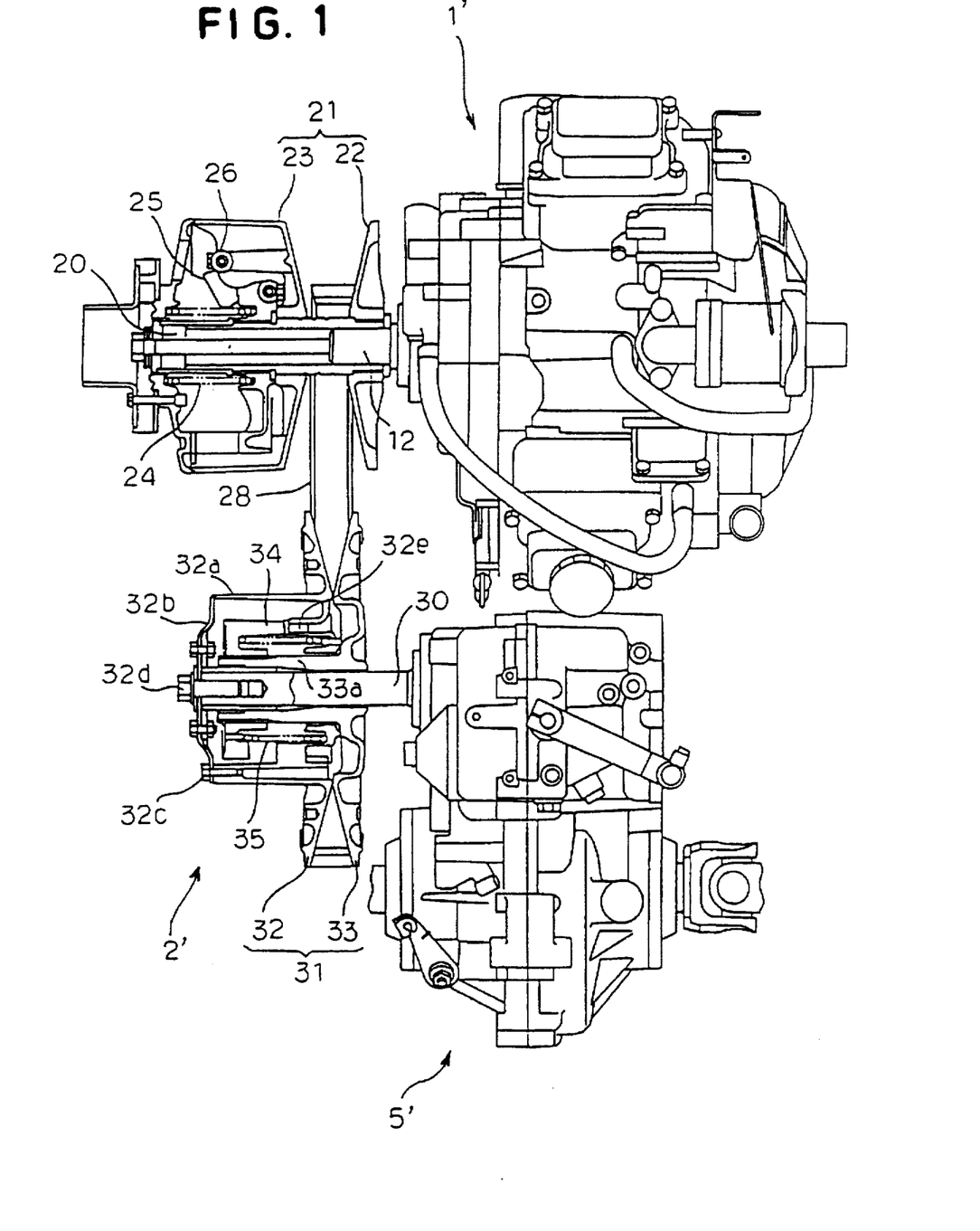
FIG. 1 is a schematic view showing the entire structure of a belt-type automatic transmission 2 with an engine 1 and others.
Figure 2:
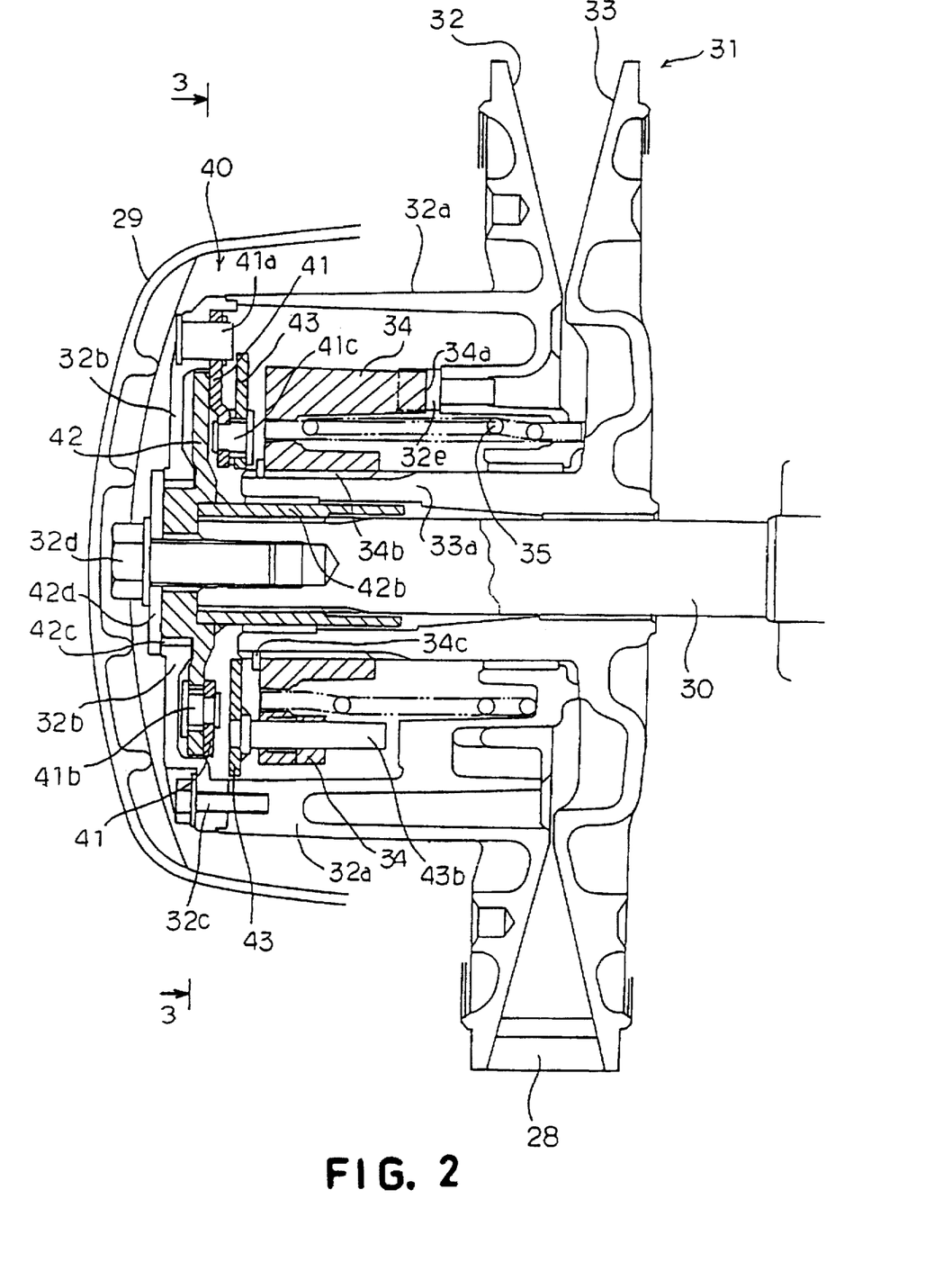
FIG. 2 is a detailed cross-sectional view showing a driven shaft 30, a pair of sheaves 31 provided thereon and others as main parts of FIG. 1.
Figure 3A:
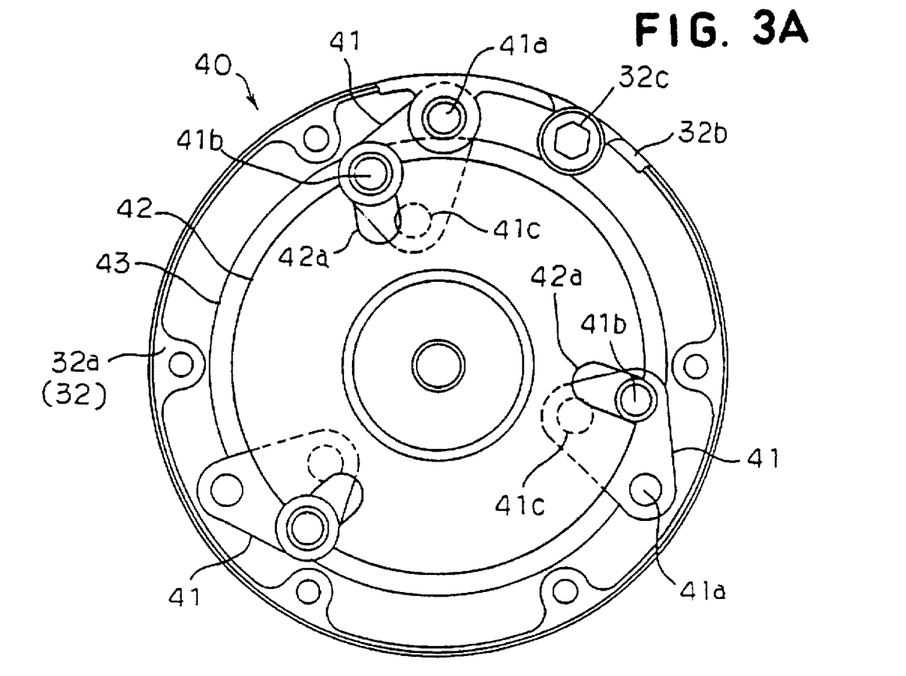
Figure 3B:
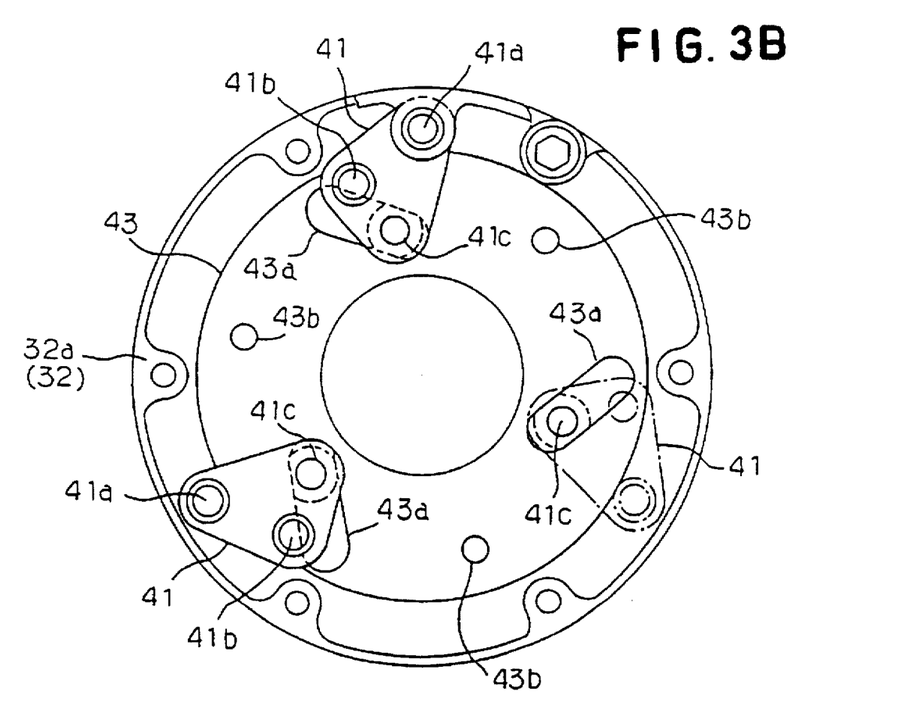
Figure 4A:
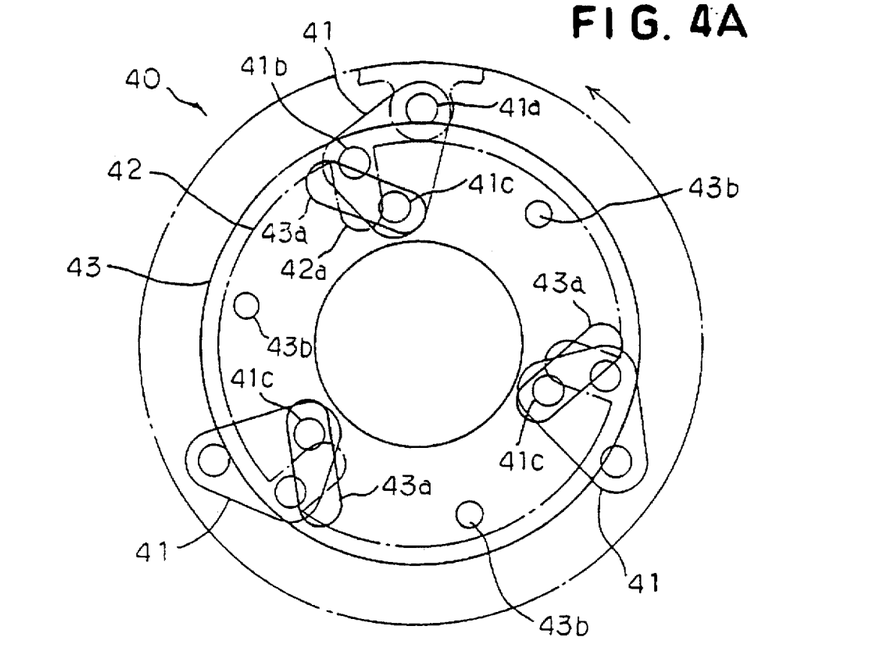
Figure 4B:
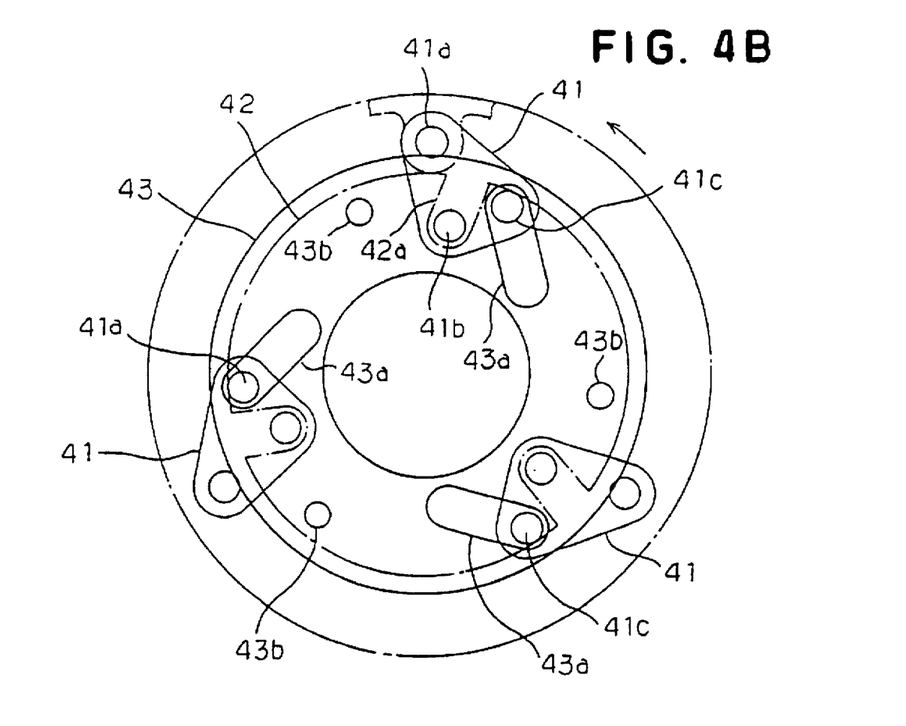

A preferred embodiment of the present invention will be described in more detail with reference to the drawings. FIGS. 1 to 4 show an embodiment of the present invention. FIG. 1 is a schematic view showing the entire structure of a belt-type automatic transmission 2 with an engine 1 and others. FIG. 2 is detailed cross-sectional view showing a driven shaft 30, a pair of sheaves 31 provided thereon and others as main parts of FIG. 1. FIGS. 3 are views seen in the direction of the arrow III—III shown in FIG. 2. FIG. 3 (a) is a view having a cover 32b in FIG. 2 omitted, and FIG. 3 (b) is a view having a first disc 42 in FIG. 2 omitted. FIGS. 4 (a) and (b) are views for explaining the function of the automatic transmission 2, wherein the arrows indicate the directions of revolution.

An automatic transmission 2 shown in FIG. 1 is provided on a working four-wheel vehicle (not shown) in the same manner as the automatic transmission 2' in FIG. 5 described above. The automatic transmission 2 is connected between an engine 1 and a transmission 5 as shown in FIG. 1. The output of the engine 1 is generated by a crankshaft 12 which is connected to a piston 11. The automatic transmission 2 transmits the output through the two-stage gear transmission 5 while automatically changing a speed continuously. The transmission 5 transmits the output to driving wheels (not shown) through an output shaft 51. The transmission 5 is gear type transmission having the two-stage range, which consists of the HIGH stage which is suitable for running at a relatively high speed and the LOW stage which is suitable for running at a relatively low speed. Such HIGH and LOW can manually be selected according to the load of a vehicle, the condition of a road and the like. In this way, the transmission 5 works as speed change transmission in combination with the transmission 2, or it can be said that transmission 5 encourages the work of the transmission 2.

Basically, the automatic transmission 2 shown in FIG. 1 has the same structure as the automatic transmission 2' shown in FIG. 5 in which two pairs of sheaves 21 and 31 are attached to a driving shaft 20 connected to the crankshaft 12 and a driven shaft 30 connected to the transmission 5 respectively, and a V belt 28 is mounted around the pair of sheaves 21 and the pair of sheaves 31. The pair of sheaves 21 provided on the driving shaft 20 include a fixed sheave 22 and a movable sheave 23. The fixed sheave 22 cannot move in the axial direction. Although the movable sheave 23 has a spring 24, the movable sheave receives the force caused by increasing of revolution speed by the operation of a centrifugal cam 25 and a roller 26, which results in that the movable sheave approaches the fixed sheave 22 by the aforementioned force effecting against said spring 24. The pair of sheaves 31 provided on the driven shaft 30 include a fixed sheave 32 and a movable sheave 33 which receives the force to approach the fixed sheave 32 based on the elastic force of a torsion coil spring 35. As shown in FIG. 2, a torque cam (ramp) 34 is provided on a cylindrical member 33a of the movable sheave 33 through a spline 34b and a snap ring 34c. The torque cam 34 has an inclined surface 34a which is inclined in the axial and radial directions. In addition, a sliding member 32e which keeps in contact with the inclined surface 34a is provided on the fixed sheave 32. They operate for causing the elastic force of the torsion coil spring 35 to act on the movable sheave 33 in the axial direction toward the fixed sheave 32. As described above, the automatic transmission 2 and the automatic transmission 2' shown in FIG. 5 have many things in common. For this reason, the same portions have the same numbers as in FIG. 5 and the detailed description will be omitted. The reference numeral 29 shown in FIGS. 1 and 2 denotes a protective cover for covering the shafts 20 and 30 and the pairs of sheaves 21 and 31.

The automatic transmission 2 is different from the automatic transmission 2' shown in FIG. 5 in the following respects. First of all, the maximum opening between the pair of sheaves 21 provided on the driving shaft 20 is restricted as shown in FIG. 1 and the fixed sheave 22 and the movable sheave 23 always hold the V belt 28 therebetween. The maximum opening means the maximum space between opposite faces. FIG. 1 shows the condition of the maximum opening in solid lines. Consequently, the V belt 28 is not loosened and can always transmit power. As described below, such a structure is provided so as to constantly transmit the braking force generated by the engine 1 (so-called engine brake) to driving wheels also in case a vehicle runs on a downward slope.

Secondly, the driving shaft 20 is not directly connected to the crankshaft 12 of the engine 1 but connected to the crankshaft 12 through a clutch 15 for starting movement and gears 16 and 17. The clutch 15 for starting movement is a kind of centrifugal clutch, and is automatically engaged for power transmitting when the revolution speed exceeds a predetermined value. Accordingly, if the revolution speed is more than the predetermined value, the power of the crankshaft 12 is always transmitted to an outside case of the clutch so as to drive the gear 16 which is attached thereto. Then, the power is transmitted from the gear 17 to the driving shaft 20 and others. The reason why the clutch 15 and others are provided is that it is necessary to avoid the so-called creep by preventing to transmit the revolution of the engine 1 to the driving wheels during idling condition, in spite that the belt 28 is ready to transmit power as described above. The clutch 15 has the one way clutch function for constantly transmitting revolving torque from the automatic transmission 2 (driving shaft 20) or the gears 16, 17 side to the crankshaft 12 so that the braking force of the engine brake can be always transmitted to the driving wheels even though the revolution speed of the engine 1 is less than the idling speed. The braking force of the engine brake is not the driving force of the engine 1 but the force for braking the driving wheels by friction or the like.

Thirdly, shift-up prevention means 40 is provided among the driven shaft 30, the fixed sheave 32 and the torque cam 34 as shown in FIG. 2. The shift-up prevention means 40 serves to prevent shift-up so as to hardly increase the space between the pair of sheaves 31 when the engine 1 does not drive the driving wheels but transmits the braking force (the operation of the engine brake) to the driving wheels, in other words, when the revolving torque is transmitted from the driven shaft 30 to the pair of sheaves 31. Further, the means 40 has the following structure:

(1) A link 41 is attached to the inside of the cover 32b through a connecting pin 41a so as to pivot. The cover 32b is integrated with the fixed sheave 32. According to this embodiment, three links 41 are provided as shown in FIG. 3. A pin 41a is provided in parallel with the driven shaft 30. Consequently, each link 41 can also perform relative revolution on a face perpendicular to the driven shaft 30.

(2) A part of the link 41 has a connecting pin 41b provided in parallel with the pin 41a. The pin 41b is loosely fitted in a first disc 42 which is fixed to the driven shaft 30 as shown in FIG. 2. The first disc 42 has a cylindrical member 42b integrated therewith. The cylindrical member 42b is spline-connected onto the driven shaft 30 and fixed to the end of the driven shaft 30 with a bolt 32d. As shown in FIG. 3 (a), the first disc 42 has a slot 42a provided on the periphery. The pin 41b is loosely fitted in the first disc 42 so as to move in the slot 42a. Consequently, the link 41 keeps connection to the first disc 42 while pivoting around the pin 41a within the predetermined range. As shown in FIG. 2, a lubricous bush 42c is provided between the first disc 42 and the cover 32b integral with the fixed sheave 32. Thereby, the first disc 42 can be revolved relative to the fixed sheave 32 and the like.

(3) Another part of the link 41 has a connecting pin 41c is loosely fitted in a second disc 43 in parallel with the pin 41a. As shown in FIG. 3 (b), the pin 41c is fitted inside a slot 43a formed on the second disc 43 so that it can move. Consequently, the link 41 can pivot with the second disc 43 connected thereto. As shown in FIG. 2, the second disc 43 has a rod 43b provided in parallel with the driven shaft 30. The rod 43b penetrates the torque cam 34 so as to freely slide in the axial direction, so that the movement of the second disc 43 in the revolving direction corresponds to the rotational displacement of the torque cam 34.

According to the structures (1), (2) and (3), the fixed sheave 32 and the driven shaft 30 which are directly connected to each other in the automatic transmission 2' shown in FIG. 5 are connected through the first disc 42 and the link 41 including the connecting pins 41a and 41b so that torque can be transmitted from the fixed sheave 32 to the driven shaft 30, and/or transmitted from the driven shaft 30 to the fixed sheave 32, through the first disc 42 and the link 41, and the link 41 engages with the torque cam 34 through the connecting pin 41c and the second disc 43 as shown in FIG. 2. Consequently, the automatic transmission 2 operates in the following manner.

(a) When the speed of the engine 1 shown in FIG. 1 exceeds the predetermined revolution speed, the clutch 15 is automatically connected. Consequently, power is transmitted to the driven shaft 30 through the driving shaft 20, the V belt 28 and others, and then to the driving wheels (not shown) through the transmission 5. In this case, torque is transmitted from the cover 32b shown in FIG. 2 to the first disc 42 through the link 41 between the driven shaft 30 and the fixed sheave 32 which receives the power from the V belt 28. Consequently, the torque is transmitted to the driven shaft 30 which is spline-connected to the first disc 42. The movable sheave 33 is connected to the fixed sheave 32 through both the torsion coil spring 35 and the torque cam 34. Consequently, the power which is transmitted from the V belt 28 to the movable sheave 33 is transmitted to the link 41, the first disc 42 and others through the fixed sheave When a vehicle runs within the so-called low-speed range, the torsion coil spring 35 is retained without any deformation in the shape as shown in FIG. 2, and thereby, the automatic transmission 2 is also retained in the conditions shown in FIGS. 1 and 3(a), and (b), and 4(a).

(b) When the revolution speed of the driving shaft 20 is considerably increased according to increasing of the revolution speed of the engine 1 shown in FIG. 1, the space between the pair of sheaves 21 gets narrow by the operation of the centrifugal cam 25 and others. As a result, the pair of sheaves 31 of the driven shaft 30 increase the opening in the conditions shown in FIGS. 1 and 2, so that the automatic transmission 2 is automatically shifted up to the so-called high-speed range side. When the automatic transmission 2 is shifted up, the link 41 and the first disc 42 and the second disc 43 take the positions shown in FIG. 4 (b). In FIG. 2, when the movable sheave 33 goes away from the fixed sheave 32, the movable sheave 33, the torque cam 34 and others revolve by a predetermined angle along the inclined surface 34a which abuts on the sliding member 32e of the fixed sheave 32 while elastically deforming the torsion coil spring 35. Consequently, the attitudes of the link 41 and others change.

(c) When the vehicle runs on a downward slope, the revolving torque is transmitted to the pair of sheaves 31 from the driven shaft 30 which is revolved by the driving wheels and tries to be revolved faster, and then the vehicle receives the operation of the engine brake. In this case, the link 41, the first disc 42 and the second disc 43, and others return to the positions shown in FIG. 4 (a) and keep said position thereof. The reason is that the first disc 42 which is fixed to the driven shaft 30 shown in FIG. 2 and tries to be revolved faster than the pair of sheaves 31 displaces the link 41 through the connecting pin 41b as shown in FIG. 4 (a), and the connecting pin 41c of the link 41 revolves and displaces the second disc 43 counterclockwise as shown in FIG. 4 (a). When the second disc 43 is revolved and displaced as described above, the torque cam 34 shown in FIG. 2 is caused to revolve and displace through the rod 43b so that the inclined surface 34a is pushed onto the sliding member 32e. Thereby, further force, which encourages the elastic force of the torsion coil spring 35, to cause the movable sheave 33 to approach the fixed sheave 32 is generated. Thus, when the force to make the pair of sheaves 31 approach each other is increased, the wrapping radius of the V belt 28 on the driven shaft 30 is not reduced. Consequently, even though the revolution speed of the driving shaft 20 (FIG. 1) is increased with a rise in vehicle speed and the like, the opening between the pair of sheaves 21 is prevented from being reduced. As a result, the wrapping radius is not increased and the shift-up operation is prevented. When the engine brake works on the downward slope, the shift-up prevention is automatically carried out. For this reason, it is not necessary for driver to operate the automatic transmission 2 and the like. When the engine brake works harder, the force caused by the engine brake operation for the first disc 42 to keep the link 41 in the attitude shown in FIG. 4 (a) is increased. Consequently, the approach force added to the pair of sheaves 21 is increased, that is, the shift-up can be prevented harder.

The belt-type automatic transmission of the present invention has the following effects.

(1) When a vehicle runs on a downward slope, the engine brake can work effectively for driving wheels.

(2) Even though the speed of the vehicle is increased on the downward slope, the speed change ratio can be prevented from moving to the high-speed range so that the engine brake can continuously work.

(3) The manual operation of making the engine brake work as described in (1) and (2) is not necessary.

(4) Further, a link is used for shift-up prevention means. Consequently, the automatic transmission smoothly operates and has a simple structure.

(5) As the engine brake works harder, as like the case of running on the steep downward slope, change to the high-speed range is apt to be more prevented. As a result, the vehicle can be easily controlled on the downward slope.

(6) The automatic transmission according to the present invention includes a torque cam and a torsion coil spring. Thus, it is possible to easily manufacture the automatic transmission on the basis of the structure of the belt-type automatic transmission according to the prior art.

Although the present invention has fully been described by way of example with reference to the accompanying drawings, it is to be understood that various changes and modifications will be apparent to those skilled in the art. Therefore, unless otherwise such changes and modifications depart from the scope of the invention, they should be construed as being included therein.

What is claimed is:

1. A belt-type automatic transmission comprising;

a first pair of sheaves provided on a driving shaft, the first pair of sheaves having a first fixed sheave which cannot move in the axial direction and a first movable sheave which is caused to approach the first fixed sheave by the force which is increased with a revolution speed, a second pair of sheaves provided on a driven shaft, the second pair of sheaves having a second fixed sheave which cannot move in the axial direction and a second movable sheave which is caused to approach the second fixed sheave by an elastic force, a V belt mounted around the pairs of sheaves on the driving and driven shafts, wherein the maximum opening between the first pair of sheaves on the driving shaft is restricted so as not to loosen the V belt, a clutch for starting movement provided between a prime mover and the driving shaft, a torque cam provided for applying said elastic force to the second movable sheave between said second movable sheave and the second fixed sheave, a link means provided for connecting the second fixed sheave to the driven shaft and for mutually transmitting a revolving torque between the driven shaft and the second fixed sheave, and wherein said link means includes means wherein a part of said revolving torque is coupled to said torque cam for enabling the second movable sheave to move towards the second fixed sheave when the revolving torque is transmitted from the driven shaft to the second fixed sheave.

2. The belt-type automatic transmission according to claim 1, wherein the second movable sheave is connected to said torque cam having a surface inclined in the axial and circumferential directions, a torsion coil spring is provided between the torque cam and the second fixed sheave, the torsion coil spring pushing the torque cam in the circumferential direction to cause the inclined surface to come in contact with a part of the second fixed sheave, thereby the elastic force is generated for the second movable sheave to approach the second fixed sheave on the driven shaft, wherein the link means comprises a link, a first connecting pin, a second connecting pin and a third connecting pin, and the link enabling said second movable sheave to approach said second fixed sheave is attached to a member integral with the second fixed sheave through the first connecting pin parallel with the driven shaft so as to revolve therewith, the second connecting pin provided on the link is loosely fitted in a member integral with the driven shaft, and the third connecting pin provided on the link is loosely fitted in a member which can push the torque cam in the circumferential direction.

3. A belt-type automatic transmission comprising;

a pair of sheaves provided on a driving shaft, the pair of sheaves having a fixed sheave which cannot move in the axial direction and a movable sheave which is caused to approach the fixed sheave by the force which is increased with a revolution speed, a pair of sheaves provided on a driven shaft, the pair of sheaves having a fixed sheave which cannot move in the axial direction and a movable sheave which is caused to approach the fixed sheave by an elastic force, and, a V belt mounted around the pairs of sheaves on the driving and driven shafts, wherein the maximum opening between the pair of sheaves on the driving shaft is restricted so as not to loosen the V belt, and a clutch for starting movement provided between a prime mover and the driving shaft and means for automatically adding the force for the movable sheave to approach the fixed sheave when revolving torque is transmitted from the driven shaft to the sheaves on the driven shaft, are provided, wherein the movable sheave on said driven shaft is connected to a torque cam having a surface inclined in the axial and circumferential directions, a torsion coil spring is provided between the torque cam and the fixed sheave, the torsion coil spring pushing the torque cam in the circumferential direction to cause the inclined surface to come in contact with a part of the fixed sheave, thereby, the elastic force is generated for the movable sheave to approach the fixed sheave on the driven shaft, and wherein a link for giving the approach force is attached to a member integral with the fixed sheave through a first connecting pin parallel with the driven shaft so as to relatively revolve, a second connecting pin provided on the link is loosely fitted in a member integral with the driven shaft, and a third connecting pin provided on the link is loosely fitted in a member which can push the torque cam in the circumferential direction.

* * * * *

UNITED STATES PATENT AND TRADEMARK OFFICE
CERTIFICATE OF CORRECTION

PATENT NO. : 5,725,446
DATED : March 10, 1998
INVENTOR(S) : HIDETOSHI KAKU, ET AL.

It is certified that error appears in the above-identified patent and that said Letters Patent is hereby corrected as shown below:

Column 2, line 35, "transmission shown" should read --transmission 2' shown--

Column 3, line 56, "a pair" should read --(a) a pair--

Column 7, line 32, "is detailed" should read --is a detailed--

Column 10, line 5, "fixed sheave" should read --fixed sheave 32--

Signed and Sealed this

Twenty-first Day of March, 2000

Attest:

Attesting Officer

Q. TODD DICKINSON

Commissioner of Patents and Trademarks